United States Patent
Zucker et al.

(10) Patent No.: US 10,447,922 B2
(45) Date of Patent: Oct. 15, 2019

(54) AUTOMATED COLOR SPACE CONFIGURATION IN MACHINE VISION SYSTEMS

(71) Applicant: NCR Corporation, Duluth, GA (US)

(72) Inventors: Brent Vance Zucker, Roswell, GA (US); Christopher John Costello, Suwanee, GA (US); Yehoshua Zvi Licht, Alpharetta, GA (US)

(73) Assignee: NCR Corporation, Atlanta, GA (US)

(*) Notice: Subject to any disclaimer, the term of this patent is extended or adjusted under 35 U.S.C. 154(b) by 21 days.

(21) Appl. No.: 15/692,924

(22) Filed: Aug. 31, 2017

(65) Prior Publication Data

US 2019/0068874 A1    Feb. 28, 2019

(51) Int. Cl.
*H04N 5/232*    (2006.01)
*H04N 1/60*    (2006.01)
*G06K 9/46*    (2006.01)
*H04N 9/64*    (2006.01)

(52) U.S. Cl.
CPC ....... *H04N 5/23222* (2013.01); *G06K 9/4652* (2013.01); *H04N 1/60* (2013.01); *H04N 1/6019* (2013.01); *H04N 1/6083* (2013.01); *H04N 9/646* (2013.01)

(58) Field of Classification Search
CPC .. H04N 5/23222; H04N 9/646; H04N 1/6083; H04N 1/6019; G06K 9/4652
See application file for complete search history.

(56) References Cited

U.S. PATENT DOCUMENTS

| 2013/0201202 | A1* | 8/2013 | Bryant | H04N 1/407 |
| | | | | 345/590 |
| 2018/0114068 | A1* | 4/2018 | Balasundaram | G06T 7/0004 |

* cited by examiner

*Primary Examiner* — Yogesh K Aggarwal
(74) *Attorney, Agent, or Firm* — Schwegman, Lundberg & Woessner

(57) ABSTRACT

One embodiment, in the form of a method, includes capturing at least one image with an imaging device of a machine vision device. The at least one image is captured within an environment within which the machine vision device is deployed. This method then queries a color scheme model based on the captured at least one image to identify a color scheme to utilize within the machine vision device and may subsequently implement the identified color scheme on the machine vision device for processing images captured by the imaging device.

20 Claims, 3 Drawing Sheets

AUTOMATED COLOR SPACE CONFIGURATION IN MACHINE VISION SYSTEMS

BACKGROUND INFORMATION

Businesses and consumers are beginning to heavily rely on applications of computer vision in their workflows and products. Computer vision and image processing go hand in hand. Image processing analyzes and manipulates the digitized image (which is represented as a mathematical matrix). A big component of image processing is to select which color scheme, and channels, to represent the image as. Humans look at images in the Red, Green, Blue (RGB) color scheme, but often one channel of RGB, such as red, may enhance methods like edge detection, object recognition, etc. The same applies to other color schemes such as HSV, HSL, CMYK, etc.

Currently, developers manually select a color scheme and channel for a given application. However, designating a color scheme to an application limits its flexibility, portability, and effectiveness. For example, if an application is meant to be run for a convenience store, indoors without windows and away from sunlight, the application will have to be redeveloped for to be used for a store with windows, such as in Florida. This is impractical and expensive.

SUMMARY

To address the impractical and expensive nature of prior machine vision solutions that need to be redeveloped to operate according to an alternative color scheme, the various embodiments herein provide flexibility within machine vision systems to automatically tailor the color scheme they operate with according to dynamic environmental conditions. Some such embodiments leverage on artificial intelligence in machine vision applications that select an effective color scheme for the deployed environment.

One embodiment, in the form of a method, includes capturing at least one image with an imaging device of a machine vision device. The at least one image is captured within an environment within which the machine vision device is deployed. This method then queries a color scheme model based on the captured at least one image to identify a color scheme to utilize within the machine vision device and may subsequently implement the identified color scheme on the machine vision device for processing images captured by the imaging device.

Another method embodiment includes querying a color scheme model based on an image captured by a camera of a machine vision system to identify a color scheme to utilize within the machine vision system and then implements the identified color scheme on the machine vision system.

A further embodiment, in the form of a machine vision system, includes a camera, a processor, a memory storing instructions executable by the processor to perform data processing activities. In some embodiments, the data processing activities include capturing at least one image with the camera, the image captured within an environment within which the machine vision system is deployed and querying a color scheme model based on the captured at least one image to identify a color scheme to utilize within the machine vision system. The data processing activities may then implement the identified color scheme on the machine vision system for processing images captured by the camera.

DETAILED DESCRIPTION

Figure 1:
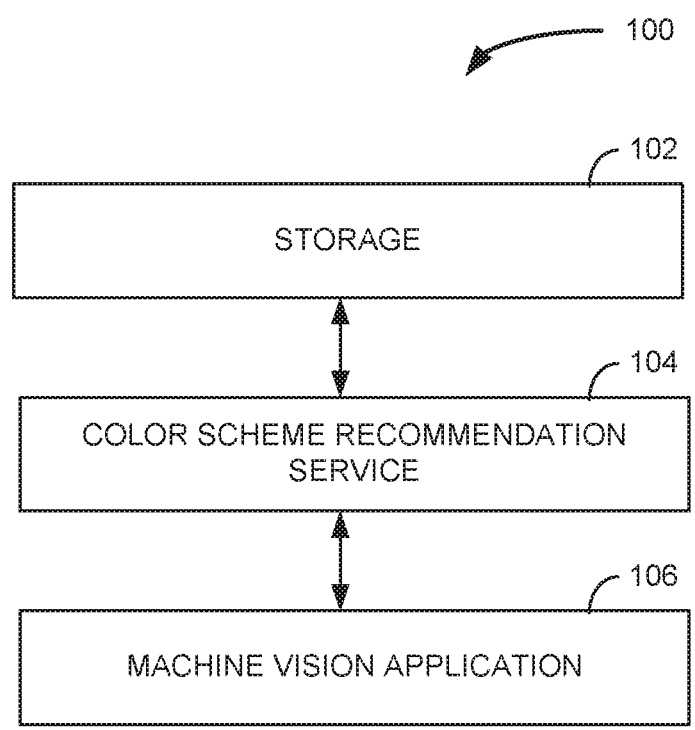
FIG. 1 is a logical architectural diagram of system components involved in automated color space configuration for machine vision systems, according to an example embodiment.

To address the impractical and expensive nature of prior machine vision solutions that need to be redeveloped to operate according to an alternative color scheme, the various embodiments herein provide flexibility within machine vision systems to automatically tailor the color scheme they operate with according to dynamic environmental conditions. Some such embodiments leverage on artificial intelligence in machine vision applications that select an effective color scheme for the deployed environment.

Some such embodiments enable machine vision applications to autonomously select a color scheme/channel by using features in it consumes through a camera. Some machine vision applications include a single camera while others include multiple. When there are multiple cameras, some embodiments use a single color scheme with regard to all cameras while other embodiments may utilize a uniquely selected color scheme for each camera.

Some embodiments that automate the color scheme selection may utilize a data set of known images with metadata, such as with regard to brightness, color histogram, and the like, and which a set color scheme to be used for that image is specified. A machine learning algorithm is then applied to learn from the received input that images with such features are to be processed according to the identified color scheme. This builds a color scheme model which is then implemented within a machine vision application. The machine vision application may then be deployed to an environment and an image is captured within the environment and the image is processed according to the automated process to identify which color scheme to utilize. That identified color scheme is them implemented and the autonomous service completes and outputs which color scheme to use. The application then runs the implementation corresponding to the selected color scheme.

Note that a color scheme model is a machine learning model trained on images with the ideal color space/scheme. While references herein refer to a single model trained for each of a plurality of color schemes, in some embodiments there may be multiple models, one for each color scheme.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical architectural diagram of system 100 components involved in automated color space configuration for machine vision systems, according to an example embodiment. The system 100 includes a machine vision 102 application that operates to identify certain features within images captured by one or more cameras. The features are defined within the application 102 or data consumed by the application 102. The application 102 is developed to identify features within images having certain properties. One of these properties is a color scheme, such as grey scale, RGB, black and white, and the like. Thus, when the images are captured or at least before they are processed by the application 102, the images need to be in a color scheme the application 102 is configured to operate against.

The application 102 includes a configuration setting that sets the color scheme. This configuration setting is set for the application 102 by a same process, in some embodiments, that modifies a configuration setting of a camera or an image post capture process to provide captured images to the application according to the proper color scheme.

In operation, images are captured by a camera that feeds image data to the application 102. If the application 102 and the cameras do not yet have a color scheme configuration setting, if the image is received by the application 102 in an improper color scheme, if a reconfiguration period has expired, if the application 102 detects a configuration anomaly, or other occurrence, the image is provided to a color scheme recommendation service 104. The image is then processed to select a color scheme based on prior training. In some embodiments, this includes identifying most closely matching feature types present in the image with features of training images, considering lighting, glare, texture, and other image properties in view of training images. The image and metadata identifying the identified color scheme may then be stored in storage 106 for later consideration, modification, and retraining of the color scheme recommendation service 104. The identified color scheme is then provided to the application 102 and the camera.

Figure 2:
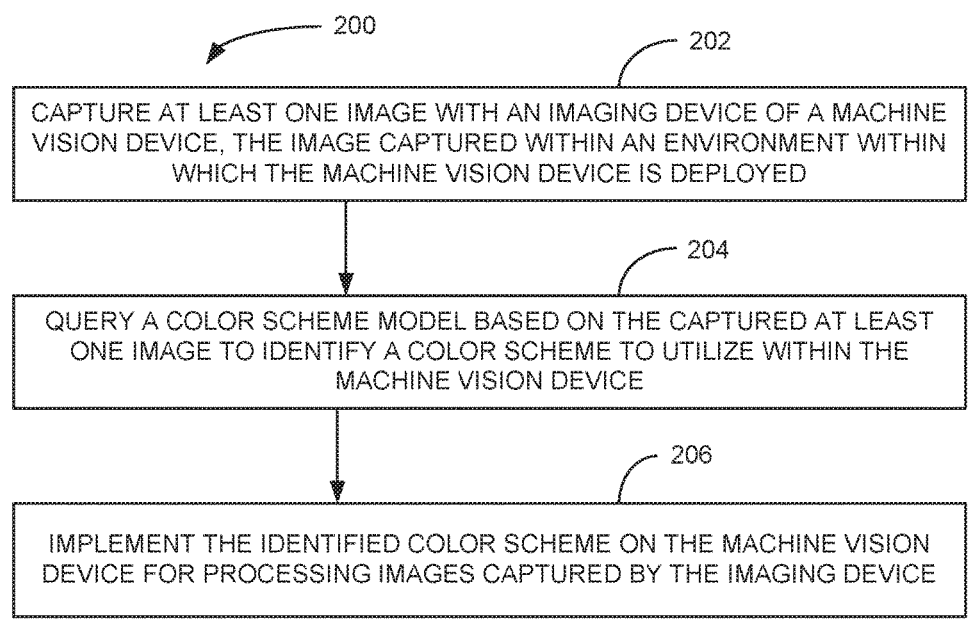
FIG. 2 is a logical block diagram of a method, according to an example embodiment.

FIG. 2 is a logical block diagram of a method 200, according to an example embodiment. The method 200 is an example of a method that may be performed to automate color space configuration in machine vision systems.

The method 200 includes capturing 202 at least one image with an imaging device of a machine vision device, the image captured within an environment within which the machine vision device is deployed. The method 200 further includes querying 204 a color scheme model based on the captured at least one image to identify a color scheme to utilize within the machine vision device. IN some instances, the method 200 may then implement 206 the identified color scheme on the machine vision device for processing images captured by the imaging device.

In some embodiments of the method 200, the color scheme model is initially built by a machine learning algorithm from a set of electronic training images that include metadata designating a color scheme well suited for identifying desired features therein. In some such embodiments, the method 200 further includes storing each of the at least one captured images and data identifying the color scheme of the color model the querying identified when processing the respective image. These embodiments may then receive corrective input with regard to one of the at least one images identifying a different color scheme than identifying by the querying. The machine learning algorithm may then update the color scheme model based on the corrective input.

In some embodiments of the method 200, implementing 206 the identified color scheme includes updating at least one configuration setting that instructs the imaging device or an image processing algorithm to output images in a form of the identified color scheme. This same updated at least one configuration setting may also, or alternatively, instruct machine vision algorithms that process captured images which code elements to execute or what processing parameters to use in processing images in the identified color space.

The method 200, and these various embodiments may be performed automatically, without human input starting performance thereof. For example, execution may be initiated automatically upon one or both of an event occurrence and a period elapsing.

In some embodiments, the querying 204 of the color scheme model when identifying a color scheme model, selects the color scheme model from a group of color schemes represented in the color scheme model. The group of color schemes represented in the color scheme model may include grey scale, black and white, RGB, CMYK, and others.

Figure 3:
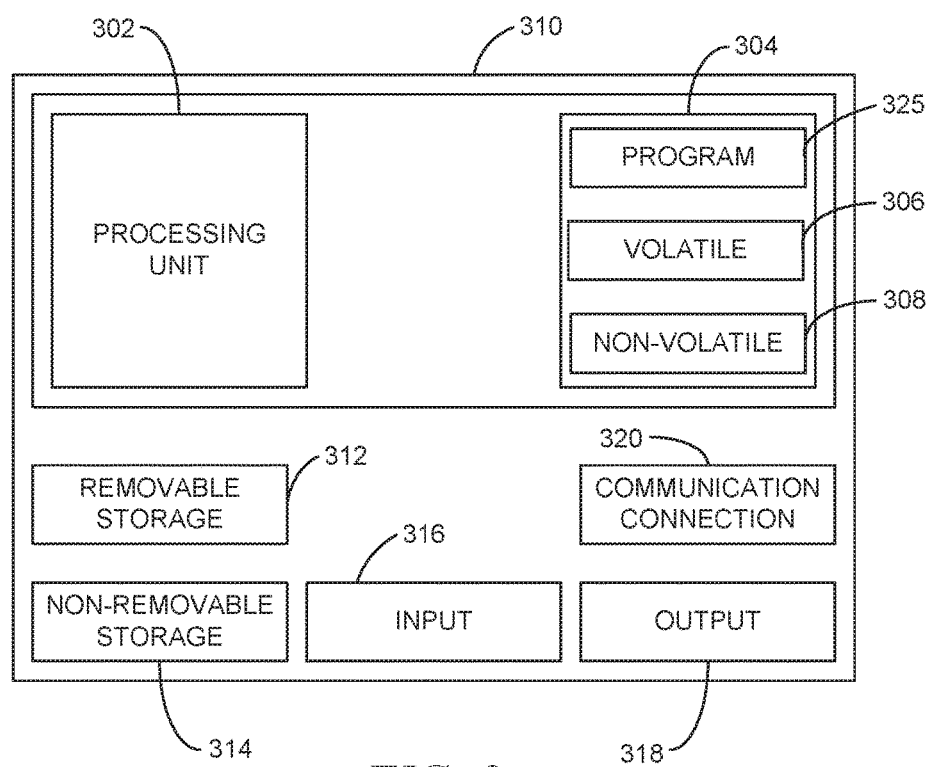
FIG. 3 is a block diagram of a computing device, according to an example embodiment.

FIG. 3 is a block diagram of a computing device, according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 310, may include a processing unit 302, memory 304, removable storage 312, and non-removable storage 314. Memory 304 may include volatile memory 306 and non-volatile memory 308. Computer 310 may include—or have access to a computing environment that includes—a variety of computer-readable media, such as volatile memory 306 and non-volatile memory 308, removable storage 312 and non-removable storage 314. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 310 may include or have access to a computing environment that includes input 316, output 318, and a communication connection 320. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 302 of the computer 310. A hard drive, CD-ROM, and RAM are some examples of articles including a non-transitory computer-readable medium. For example, a computer program 325 capable of performing one or more of the methods illustrated and described herein.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
    capturing at least one image with an imaging device of a machine vision device, the image captured within an environment within which the machine vision device is deployed;
    querying a color scheme model based on the captured at least one image to identify a color scheme to utilize within the machine vision device; and
    implementing the identified color scheme on the machine vision device for processing images captured by the imaging device after the images are captured and before further processing.

2. The method of claim 1, wherein the color scheme model is initially built by a machine learning algorithm from a set of electronic training images that include metadata designating a color scheme well suited for identifying desired features therein.

3. The method of claim 2, further comprising:
    storing each of the at least one captured images and data identifying the color scheme of the color model the querying identified when processing the respective image;
    receiving corrective input with regard to one of the at least one images identifying a different color scheme than identifying by the querying; and
    updating, by the machine learning algorithm, the color scheme model based on the corrective input.

4. The method of claim 1, wherein implementing the identified color scheme includes:
    updating at least one configuration setting that instructs the imaging device or an image processing algorithm to output images in a form of the identified color scheme; and
    instructs machine vision algorithms that process captured images which code elements to execute or what processing parameters to use in processing images in the identified color space.

5. The method of claim 1, wherein the method is performed automatically, without human input starting performance thereof.

6. The method of claim 5, wherein execution is initiated automatically upon one or both of an event occurrence and a period elapsing.

7. The method of claim 1, wherein the identified color scheme is selected from a group of color schemes represented in the color scheme model.

8. The method of claim 7, wherein the group of color schemes represented in the color scheme model includes:
    grey scale;
    black and white; and
    red, green, blue (RGB).

9. A method comprising:
    querying a color scheme model based on an image captured by a camera of a machine vision system to identify a color scheme to utilize within the machine vision system; and
    implementing the identified color scheme on the machine vision system for processing images captured by the imaging device after the images are captured and before further processing.

10. The method of claim 9, wherein the identified color scheme is implemented to designate a color scheme in which images will be processed within the machine vision system.

11. The method of claim 10, wherein implementing the identified color scheme includes at least one configuration setting that instructs the camera of the identified color scheme such that images are captured in accordance therewith and instructs image processing program elements to process the images according to the identified color scheme.

12. The method of claim 9, wherein the identified color scheme is selected from a group of color schemes represented in the color scheme model.

13. The method of claim 12, herein the group of color schemes represented in the color scheme model includes:
    grey scale;
    black and white; and
    red, green, blue (RGB).

14. The method of claim 9, wherein the color scheme model is initially built by a machine learning algorithm from a set of electronic training images that include metadata designating a color scheme well suited for identifying desired features therein.

15. The method of claim 14, further comprising:
    storing each of the at least one captured images and data identifying the color scheme of the color model the querying identified when processing the respective image;
    receiving corrective input with regard to one of the at least one images identifying a different color scheme than identifying by the querying; and
    updating, by the machine learning algorithm, the color scheme model based on the corrective input.

16. A machine vision system comprising:
    a camera;
    a processor;
    a memory storing instructions executable by the processor to perform data processing activities comprising:
        capturing at least one image with the camera, the image captured within an environment within which the machine vision system is deployed;

querying a color scheme model based on the captured at least one image to identify a color scheme to utilize within the machine vision system; and implementing the identified color scheme on the machine vision system for processing images captured by the camera after the images are captured and before further processing.

17. The machine vision system of claim 16, wherein the color scheme model is stored in the memory and is initially built by a machine learning algorithm from a set of electronic training images that include metadata designating a color scheme well suited for identifying desired features therein.

18. The machine vision system of claim 17, further comprising:

storing, on the memory, each of the at least one captured images and data identifying the color scheme of the color model the querying identified when processing the respective image;

receiving corrective input with regard to one of the at leak one images identifying a different color scheme than identifying by the querying; and updating, by the machine learning algorithm, the color scheme model based on the corrective input.

19. The machine vision system of claim 16, wherein the identified color scheme is selected from a group of color schemes represented in the color scheme model.

20. The machine vision system of claim 19, wherein the group of color schemes represented in the color scheme model includes:

grey scale;
black and white; and
red, green, blue (KGB).

* * * * *